INVENTOR
HARVEY J. GOETZ,
BY William J Fox
ATTORNEY

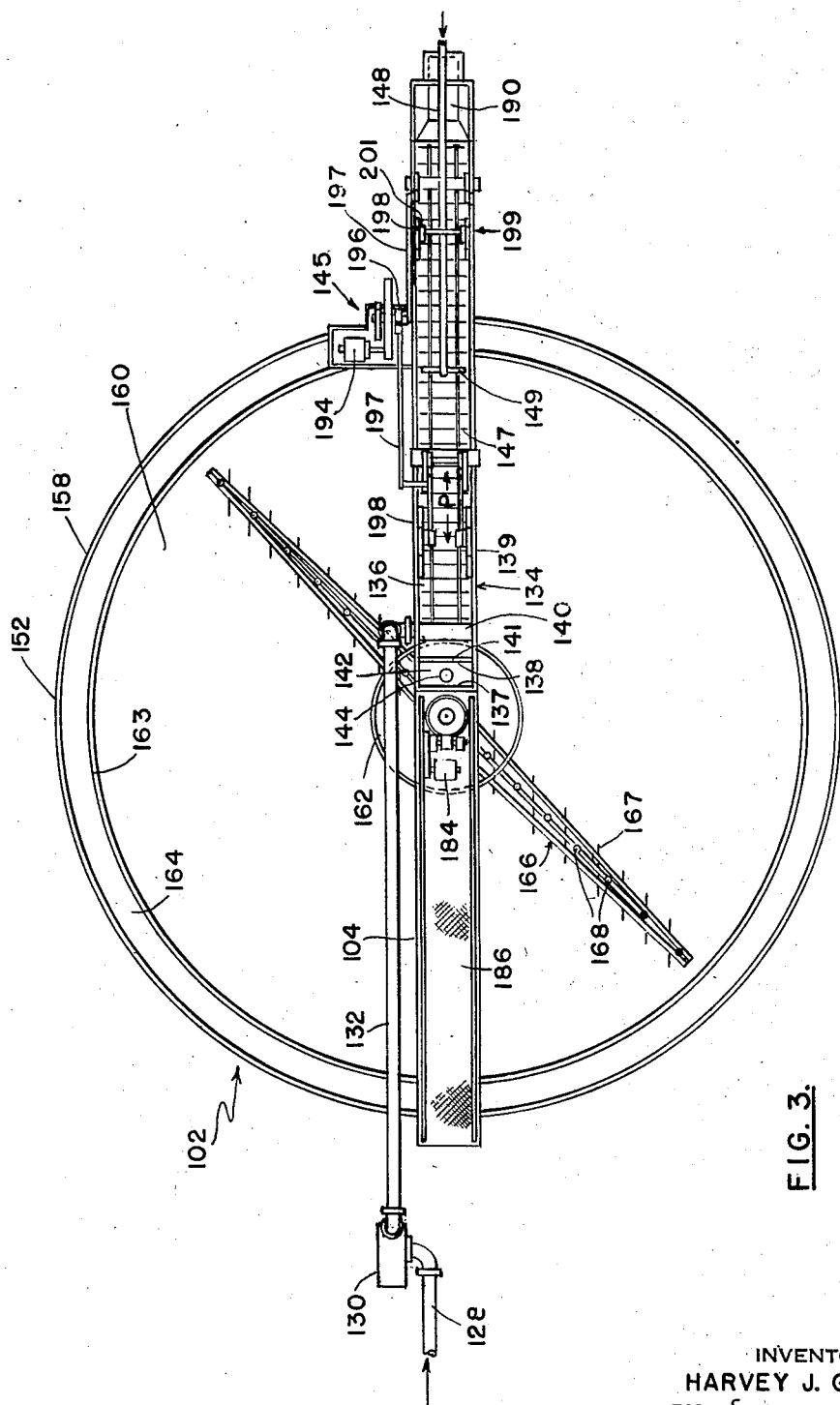

United States Patent Office 2,846,072
Patented Aug. 5, 1958

2,846,072

METHOD AND APPARATUS FOR GRIT REMOVAL FROM POLLUTED LIQUIDS

Harvey J. Goetz, Maywood, Ill., assignor to Dorr-Oliver Incorporated, a corporation of Delaware Application November 30, 1953, Serial No. 395,023

10 Claims. (Cl. 210—67)

This invention relates to an improvement in the purification and stabilization treatment of polluted liquids such as domestic sewage, industrial trade wastes, and the like. More particularly, it relates to the removal of suspended and transported solids from such liquids and the subsequent treatment of said solids to render them more amenable to disposal.

One of the problems involved in the treatment of polluted liquids, especially sewage, has been the presence of grit in the incoming stream. Grit is definitive of inorganic solids such as, for example, sand, soil, and small stones. Such solids find their way into the domestic sewage collection system by way of leakages from kitchen sink garbage disposal units, through holes in manhole covers during street washing and rainstorms, and particularly where storm sewers empty into the domestic sewage collection system. Incidentally, as far as this invention is concerned, polluted liquids will be considered as comprising those liquids containing at least some suspended, but settleable, solids, most commonly of organic origin, and hard, rapidly settling inorganic matter referred to as grit. Such incidental matter as paper, rags, ground garbage and similar waste will be included as suspended organic matter merely because its disposal is to be through the same channels as the suspended organic matter. In addition, the description herein will be cast in terms of sewage treatment, but it is to be understood that the invention is applicable to the treatment of other polluted liquids.

The problem is serious because grit is detrimental to the proper functioning of several steps employed in all sewage treatment processes, as well as to apparatus used in performing these steps. For example, if grit is not removed from the raw sewage prior to the step of removal by settlement of "settleable" organic solids, it will settle with said organic solids and be removed mixed in with the resultant sludge. In a number of sewage disposal plants this sludge is treated in an anaerobic biological treatment station wherein the organic solids are exposed to digestion by anaerobic micro-organisms. In such plants it has been observed that over a period of time grit accumulates within the treatment station to such an extent that grit particles interfere with the digestion process so that periodically, operation of the digester station must be stopped, liquid and biological contents must be discharged therefrom, and the remaining grit manually removed. During this shut-down raw sewage is continuously entering the plant and sludge is continuously being produced so that under such circumstances either a "standby" anaerobic biological treatment station is used or the sludge is disposed of without further treatment. In addition, it takes many weeks for such stations to resume normal operation and during that period digestion is not as complete as is usually desired. Therefore, for this and other reasons, it is considered that removal of grit is a prerequisite to present day sewage disposal.

There are two basic reasons why in the past, no one has carried out a sewage treatment process calling for the deliberate, simultaneous sedimentation of organic solids and grit, with subsequent removal of grit from the sludge thus formed. The first reason revolves around the fact that present theories and methods of treatment of sludge dictate that sludge delivered to such treatment have as high a solids concentration as can be obtained without the sludge having previously turned septic. For example, where sewage treatment of the sludge involves digestion by anaerobic micro-organisms, the treatment station for the digestion process comprises at least one specially adapted tank called a digester. The volume of that portion of the tank in which the sludge is held for digestion is largely a function of the liquid content of the sludge being introduced into the digester. As a rule, such tanks represent an expensive item wherefore it is preferred to have a digester of as small a sludge holding volume as possible, which in turn means that sludge introduced into the digester must have as small a liquid content as possible. Consequently, it has become customary to detain sludge within the organics settling chamber a sufficient amount of time for the sludge to become thickened to the desired solids concentration before withdrawing it and subjecting it to anaerobic digestion. At such a solids concentration the bulky, flocculent, viscous nature of the sludge does not permit grit to settle out so that grit appears to be "hung up" within the sludge.

The second reason is that present theories and practices dictate that sludge be delivered to the sludge treatment in as fresh a condition as possible. Upon standing for a period of time sludge tends to turn septic to give off nocuous and offensive odors as well as to decompose to produce colloidal-like and dissolved substances extremely difficult to remove. Usually the amount of time allowed for sludge within the organics settling chamber to become thickened to the desired solids concentration is just short of that at which the sludge turns septic. The sludge must then be promptly delivered to the sludge treatment process or otherwise disposed of. Consequently, in larger installations of sewage disposal systems, it is more or less common to provide an initial chamber adapted for settling out grit from the incoming sewage stream with a subsequent chamber adapted for removal of organic matter. Heretofore, the initial chamber for the settling of grit has involved such devices as exemplified by the U. S. A. patents to Weber, Patent No. 2,033,213, to Wileman, Patent No. 2,292,855, and to Tark, Patent No. 2,266,937. Such equipment usually comprises a settling basin adapted so that at a predetermined flow rate thereto the bulk of the grit settles out therein. Because grit has a generally faster settling rate than the "settleable" organic solids fraction of raw sewage, such settling basins are customarily adapted so that at the predetermined flow rate thereto while grit will settle out therein, the bulk of suspended organic solids will be carried out of the unit.

All grit is detrimental but in some instances, it has been economically feasible to remove only those grit particles which appear to cause the most trouble. According to eminent authorities these particles are +65 mesh particles under most circumstances and occasionally +100 mesh particles. Hence a number of grit chambers are adapted to remove at the predetermined flow rate thereto at least 95% of +65 mesh grit particles, and in others 95% of the +100 mesh particles.

The problem of grit removal in initial settling basins, however, is complicated by the uneven flow of incoming sewage to which sewage disposal plants are subject. Not only do flow rates fluctuate over a wide range during the course of a day, and from day to day, but even more so from times of storm to periods of dry weather flow. Almost without exception, sewage flow is greatest in time of storm, and at such time the percentage of grit is generally greater than in dry periods. Consequently, the predetermined flow rate used in designing such settling basins is a matter of choice.

Where such choice is based on expected maximum flow rates, it is found that during periods of dry weather flow a substantial amount of settleable, putrescible, organic solids settle out with the grit. Upon removal of the settled matter from the grit settling chamber, and its disposal as fill or the like, the organic solids decompose to produce offensive odors and other bad effects. Even at maximum flow rates grit is covered with a tenaciously clinging, organic coating which produces similar effects upon disposal of the grit. Consequently, such devices as shown in the aforementioned patents may also be provided with means for resuspending the settled organic matter in liquid, means for removing the organic coating on the grit, and means for returning the resuspended organic matter to the sewage stream.

When flow rates exceed the predetermined flow rate to which the sewage chamber is adapted a substantial portion of grit will be transported out of the chamber with the suspended organic solids instead of being deposited within the chamber. Thus, abnormal flows make the grit chamber ineffective during such periods of flow, when, as indicated above, the percentage of grit may be the greatest. Furthermore, an increase in average flow rates because of, for example, an increase in population, also render the existing grit settling chambers ineffective. As can be seen in the aforementioned patents, installed grit settling chambers do not admit of flexibility where capacity must be increased because of a significant change in average flow rates, and/or, in the case where it is desired to change the mesh of separation to also remove smaller sizes of grit.

Another factor which must always be considered in the design and operation of such devices is equal flow distribution of the incoming stream through the grit settling chamber so that grit in settling out is evenly distributed over the bottom rather than piled up along the sides or adjacent the overflow edge of the chamber to disrupt the settling operation.

Still another disadvantage in the use of an initial grit settling chamber is the loss of a substantial portion of available "head" as far as the remainder of the plant is concerned, and indeed as far as the preceding domestic sewage collection system is concerned. In fact, a number of plants cannot now install an initial grit settling-chamber ahead of the organics settling chamber because the loss of head incurred thereby will back up the incoming raw sewage stream to such an extent that it would turn septic to produce not only foul and obnoxious odors within the collection system but also to present septic sewage to the treatment plant to thereby increase the treatment problems.

As can be seen, this approach to the problem of grit removal, i. e. initial grit settling chamber followed by an organics settling chamber, has many disadvantages, presents many operational problems, and in addition is expensive to install, operate, and maintain. Indeed, these factors have influenced towns and others having only small requirements to omit the initial grit settling chamber and attempt to cope with the problem in other ways, such as by providing larger digester space with the hope of reducing the frequency of digester shut-downs.

It is one general object of this invention, therefore, to eliminate the initial step of separately removing grit from the incoming sewage. Indeed, it is a specific object of this invention to obtain a sewage treatment system wherein an initial chamber will suffice for the separation of both grit and organic solids from raw sewage under any conditions of flow, and yet to produce in this system an acceptably thick sludge, substantially free from grit, for anaerobic digestion or disposal through other well known channels.

Another object of this invention is to arrange matters so that uneven flow conditions have substantially no effect on the removal of grit present in the raw sewage.

In addition, it is an object of this invention to arrange matters so that the grit removal system will admit some flexibility in regards to changing the mesh of separation of the grit and/or capacity of the system. Indeed, it is an object of this invention to make it feasible to remove substantially all grit.

Furthermore, it is an object of this invention to arrange matters so that grit removal can be practiced in existing plants having a no provision for grit removal, or where the provisions are inadequate, without adversely effecting existing head conditions.

Specifically, it is an object of this invention to make it possible without deleterious effects for grit to be removed from sludge after formation of sludge within the initial chamber but before the sludge is subjected to further treatment.

In summary, I propose to attain these objects, and other objects which may appear as this specification proceeds, by continuously introducing raw sewage into a pretreatment station which comprises a zone of separation and separating grit and suspended organic solids from the sewage liquid in that zone to form sludge. The liquid thus clarified is then removed from the zone and treated or disposed of, in ways well known to the art. The sludge, however, is removed substantially as soon as it has formed and is introduced into a grit separation station which essentially comprises means to contain a pool of thin sludge, means for introducing sludge into the pool, means for removing grit which settles out of the sludge, and means for removing degritted sludge from the pool.

The pool of sludge in the station is required to have a solids concentration sufficiently low to permit substantially all grit to settle out therefrom. If this value be too high, as can only be determined as each case is presented, it will be observed that the flocculent, viscous sludge tends to hold the grit particles in place so that they do not readily settle. Generally this requirement of low sludge solids concentration can be obtained by withdrawing sludge from the pretreatment station as soon as it has formed. However, it may happen for one reason or another that such sludge may still be too thick and in such case, a liquid diluent is added to the gritty sludge to reduce the solids concentration to a value where the grit will readily settle out. This diluent may be mixed with the sludge prior to its introduction into the pool, or it may be directly introduced into the pool. In any event, the diluent preferably should have a minimal biochemical oxygen demand, and, should, wherever feasible, contain some dissolved oxygen to hinder the sludge from turning septic in the pool and in the subsequent preferred sludge thickening step.

As grit collects on the bottom of the pool it will usually be observed that there is a coating of organic matter on each particle, and in addition there may be residual, settled organic solids mixed in with the settled grit. Consequently, the grit separating station should preferably comprise means for resuspending in the pool the settled organic solids as well as means for washing the grit before it is discharged. Said washing means may comprise liquid introduction means, and, as is the case with liquid used primarily as a diluent, should have a minimal biochemical oxygen demand, and should, wherever feasible, contain some dissolved oxygen.

The grit separation operation preferably should be carried out to remove substantially all grit from the sludge. Where average flow rates to the sewage treatment plant increase and more sludge is produced, or where for one reason or another it is desired to separate only grit above a predetermined size, I propose to adjust the flow rate of the gritty sludge into the grit separation station by controllably diverting a portion of the sludge withdrawn from the pretreatment station and returning it to the pretreatment station for re-separation. The flow rate to the grit separation station is controlled so that substantially all of the grit desired to be removed from the sludge introduced into the grit separation station is separated therein.

According to this invention the degritted sludge is withdrawn from the pool and preferably passed through a thickening station wherein conditions are established and maintained to permit the sludge to become thickened, without disintegration and resuspension of flocculated organic solids to the required solids concentration. This can be accomplished without substantial septicity setting in because of the requirements I have embodied in the previous steps. The thickened sludge, substantially free of detrimental grit and substantially fresh, is then disposed of through channels well known in the art.

As one aspect of this invention, an apparatus adapted to simultaneously carry out grit separation and sludge thickening may be used. This apparatus is adapted to receive this gritty sludge and to simultaneously but separately discharge washed grit, thickened degritted sludge and excess liquid. In essence such an apparatus comprises in combination a grit separation section and a sludge thickening section. The grit separation section essentially comprises a sludge receiving chamber adapted to contain therein a pool of thin gritty sludge, means for introducing thin, gritty sludge into the pool, means for removing settled grit therefrom, means for removing degritted sludge and introducing it into the sludge thickening section. Preferably, means are provided in the grit separation section for resuspending in the pool settled organic solids as well as means for washing the grit prior to its discharge. The sludge thickening section comprises a chamber adapted for receiving and holding a pool of thin degritted sludge as it undergoes thickening therein, means for removing thickened sludge, and means for removing excess liquid. In addition, means for facilitating thickening of the sludge may also be provided.

Before proceeding to describe specific embodiments of this invention it is to be understood that inasmuch as this invention may be embodied in several forms without departing from the spirit or essential characteristics thereof, the embodiments to be described hereinafter are therefore illustrative and not restrictive, since the scope of the invention is defined by the appended claims rather than by the description preceding them and all changes that fall within the metes and bounds of the claims or of forms that are their functional as well as conjointly cooperative equivalents are therefore intended to be embraced by those claims.

Turning now to the drawings:

Figure 3 is a top, full view of the apparatus of Figure 2.

Figure 1:
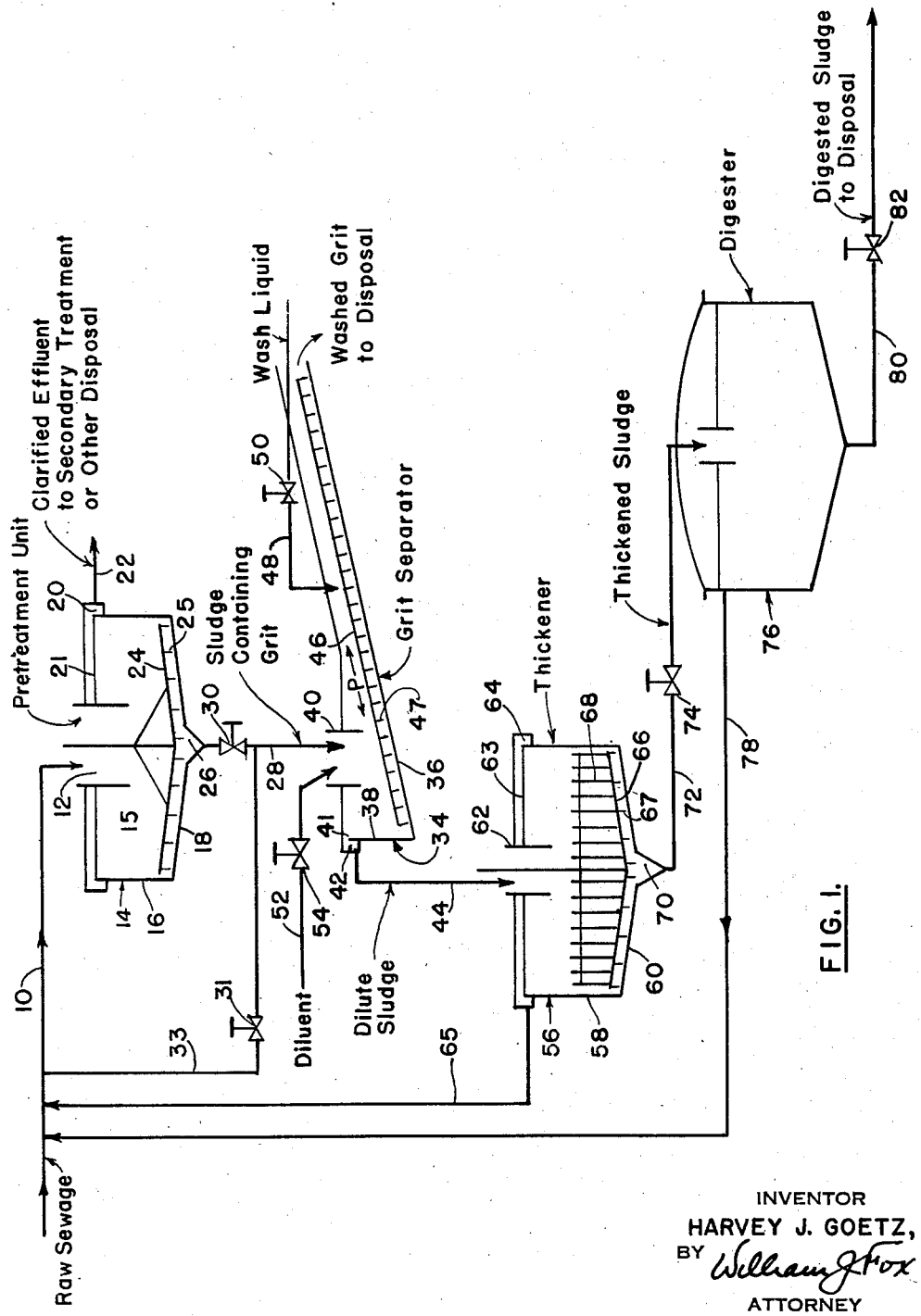
Figure 1 is a diagrammatic flowsheet illustrating the essential steps of the process of this invention in a typical sewage treatment plant adapted in accordance with this invention.

Referring more particularly to Figure 1, it will be observed that raw sewage comprising grit and suspended organic solids is continuously introduced by way of conduit 10 into chamber 12 of pretreatment station 14. Chamber 12, functioning at least as a feed introduction means for pretreatment station 14, may have other functions as well. For example, it may be a flocculation-agitation compartment containing means therein for encouraging flocculation and coagmentation of less rapidly settleable, organic solids. In any case chamber 12 communicates hydraulically with a zone of separation shown here as a surrounding zone of settlement 15 bounded by an upright marginal wall 16 and a tank bottom 18 adapted to provide horizontal settling area sufficient to settle suspended settleable solids out of the liquid flowing from chamber 12 into the zone of settlement 15. Clarified liquid rises within settling zone 15 to eventually overflow edge 21 and collect in overflow launder 20 from whence it flows through conduit 22 to secondary treatment or to disposal.

Settling solids which comprise grit and organic solids collect on the bottom 18 to form sludge. The sludge tends to move towards sludge sump 26 and collect therein for withdrawal from the tank through conduit 28. The rate of withdrawal is controlled by valve 30 which is preferably adjusted so that sludge does not have a chance to become substantially thickened whereby the sludge solids is maintained at a value sufficiently low for grit to readily settle out. To assist in the rapid withdrawal of sludge from the pretreatment unit, scraper blades 25 attached to motivated raking means 24 are provided to non-roilingly impel the sludge towards the sump 26 when the means 24 are traveling. The withdrawn gritty sludge is then introduced, as by gravity flow, into a grit separator which comprises a rectangularly shaped tank 34 adapted to contain a pool of the sludge. Said tank is characterized by a sloped bottom or inclined deck 36 submerged in the pool at one end of the tank and extending from that end upwardly above the liquid level of the pool, the angle of slope or inclination being sufficient to permit the lighter organic solids to fall backwards upon being impelled upwardly along the sloped bottom while being insufficient to allow detrimental grit to fall backwards upon being impelled up along said bottom. The horizontal cross-sectional area of the pool should preferably be sufficient for settling the smallest grit particles. In this illustration the feed introduction means comprises a feedwell 40 which functions to introduce the gritty sludge submergedly into the pool in a region functionally remote from the overflow edge. The level of the pool in the tank is more or less determined by the top of the end wall 38 of tank 34, said top providing an overflow edge 41. The grit separator is characterized in this instance by a rake arm 46 forming a part of what is ordinarily referred to as a classifier mechanism. Arranged spacedly apart from the submerged end of the tank the upper end of the inclined bottom 36, are transverse scraper blades 47 which, being attached to rake arms 46, function to impel the settled grit up along the inclined deck to the upper end thereof. The scraper blades are moved by reciprocation of the arm 46, each blade following a path P which proceeds first along the inclined deck for a distance at least equivalent to the distance between each scraper blade, then spacedly up, then back parallel to the inclined deck, and then down to the place of beginning. Means for actuating the rakes, not shown, are well known to the art, being of the construction found in the "Dorr" type classifier. Grit which settles out of the sludge collects on the bottom 36 and is impelled up the slope by the forward motion of the reciprocating scraper blades to be eventually discharged at the end of the deck 36. The turbulence induced in the liquid adjacent the deck by the passage of the blades plus the movement of grit along the deck tends to resuspend settled organic solids and thereby separate them from the settled grit. It is preferred, however, that the turbulence be insufficient to cause flocculated solids to be torn apart, because disintegrated flocs are almost impossible to re-flocculate. Separation of settled organic solids also occurs as the grit emerges from the liquid level because liquid in flowing back to its level in the tank tends to drag back into suspension residual, organic solids.

In many instances greasy or oily-like organic matter may tenaciously coat each grit particle. To remove this coat of organic matter and to further remove any residual organic settled solids, wash liquid conduit 48 is provided which functions to introduce the wash liquid on to the grit particles as they emerge from the liquid level of the sludge pool. Valve 50 in wash liquid conduit 48 provides a means of adjusting the quantity of wash liquid used, and to stop wash liquid flow when it is not needed.

As pointed out previously, it is preferred to withdraw sludge from the pretreatment station with a solids concentration sufficiently low so that grit may readily settle out of the sludge upon being introduced into the sludge pool in the grit separator. Where this condition cannot be met and sludge is withdrawn at concentration of, for example, 4% solids, and grit ceases to readily settle out at, for example, 2% or 2½% solids the sludge must be diluted to or below this latter solids concentration. For this purpose diluent conduit 52 is shown adapted to discharge into feedwell 40. Valve 54 on conduit 52 enables the amount of diluent introduced to be adjustably controlled according to the amount of dilution required for detrimental grit to be released and to freely settle, keeping in mind the fact that when wash liquid is used it also will act as a diluent in this embodiment.

The diluent and the wash liquid should, as stated previously, have a minimal biochemical oxygen demand and should, wherever feasible, contain some dissolved air or atmospheric oxygen. By choosing liquids of such characteristics the putrescible organic solids in the sludge are hindered from turning septic and decomposing to thereby "gas up" while sludge is in the grit separator, and also while sludge is being thickened.

Because of the continuous introduction of gritty sludge into the grit separator, there will be continuous overflow of dilute degritted sludge from the pool into the overflow launder 42. Said sludge is removed from the launder through conduit 44 which leads to the feed inlet means of a sludge thickening station.

It will be observed that the sludge thickening station illustrated here is a conventional type of thickener which comprises a tank 56 having a marginal wall 58 and a bottom 60, excess liquid collection means, thickened sludge discharge means, and feed inlet means. The feed inlet means comprises a feed well 62 which functions to submergedly introduce the dilute, degritted sludge into the tank in a region functionally remote from the region of withdrawal of excess liquid. Tank bottom 60 is adapted to provide sufficient horizontal settling area for the settlement of preferably all the sludge, and overflow edge 63 is placed at a sufficient heighth to provide sufficient time for the sludge to collect on the bottom and become thickened without being re-suspended in excess liquid. Actually, the sludge thickens itself by compaction; i. e. the settled solids crowd closer and closer together to squeeze out liquid from the void spaces or interstices. Because of the organic nature of the sludge, the time of detention of the thickening sludge is preferably just short of that in which the sludge turns septic and commences to "gas up." Usually, because of the requirements of this invention relating to the previous steps therein, the preferred detention time which is dependent on local conditions will be sufficient for the sludge to become thickened to a solids concentration of at least 6 or 7 percent which is that called for under present day requirements. Because of the continuous introduction of thin sludge into tank 56, excess liquid will continuously overflow from that tank. Accordingly, marginal wall 58 provides at the top thereof an overflow edge 63 which determines the liquid level of the tank. Overflow launder 64 is provided to collect the overflow while conduit 65 is connected to the launder to convey the excess liquid back to the incoming raw sewage conduit 10. To remove thickened sludge, rotatable raking means 66 are provided which comprises individual scraper blades 67 which function to non-roilingly impel the thickened sludge along the bottom 60 towards the place of discharge. To facilitate thickening, a "picket fence" structure 68 may be attached to the raking means 66 to rotate with said means. The functioning of this structure is well known in the art and need not be further described here, other than to mention that it is of the well known "Dorr" type. The thickened sludge is impelled by the scraper blades into central sludge sump 70 to which is connected sludge discharge conduit 72. Valve 74 in conduit 72 is provided whereby the thickened sludge may be withdrawn at the will of the plant operator and also to enable him to have some control over the sludge detention time in the thickener, and thus the solids concentration of the thickened sludge being discharged through conduit 72.

In many sewage treatment plants having easy access to large bodies of water, the sludge discharge conduit 72 may lead to a disposal barge or even to the body of water. In other plants the conduit may lead to drying beds or the like. It is preferred, however, that the sludge be treated so that on disposal it does not become offensive or nocuous. Accordingly, in Figure 1, conduit 72 is shown leading into a digester tank 76 wherein the degritted, thickened sludge is acted upon by anaerobic micro-organisms to produce so called digester supernatant liquid and digester sludge. The digester supernatant liquid is removed through conduit 78 and conducted thereby to incoming raw sewage conduit 10. The digester sludge, stabilized and inoffensive, is removed from digester 76 by way of conduit 80, valve 82 being provided to enable the digested sludge to be discharged from the digester at the will of the plant operator as well as to provide him some means of control over the rate of discharge.

To provide effective control over the mesh of separation of grit within the grit separation station, particularly during periods of abnormally high sludge production in the pre-treatment station and/or where it is desired to remove finer sizes of grit from the sludge, a portion of the sludge withdrawn from the pretreatment station 14 may be controllably diverted from conduit 28 and returned through conduit 33 to raw sewage conduit 10. By adjustment of valve 31 on conduit 33 a flow rate of gritty sludge to the grit separation station may be established and maintained whereat substantially all of the grit desired to be removed will be separated from the sludge introduced into the grit separation station.

Figure 2:
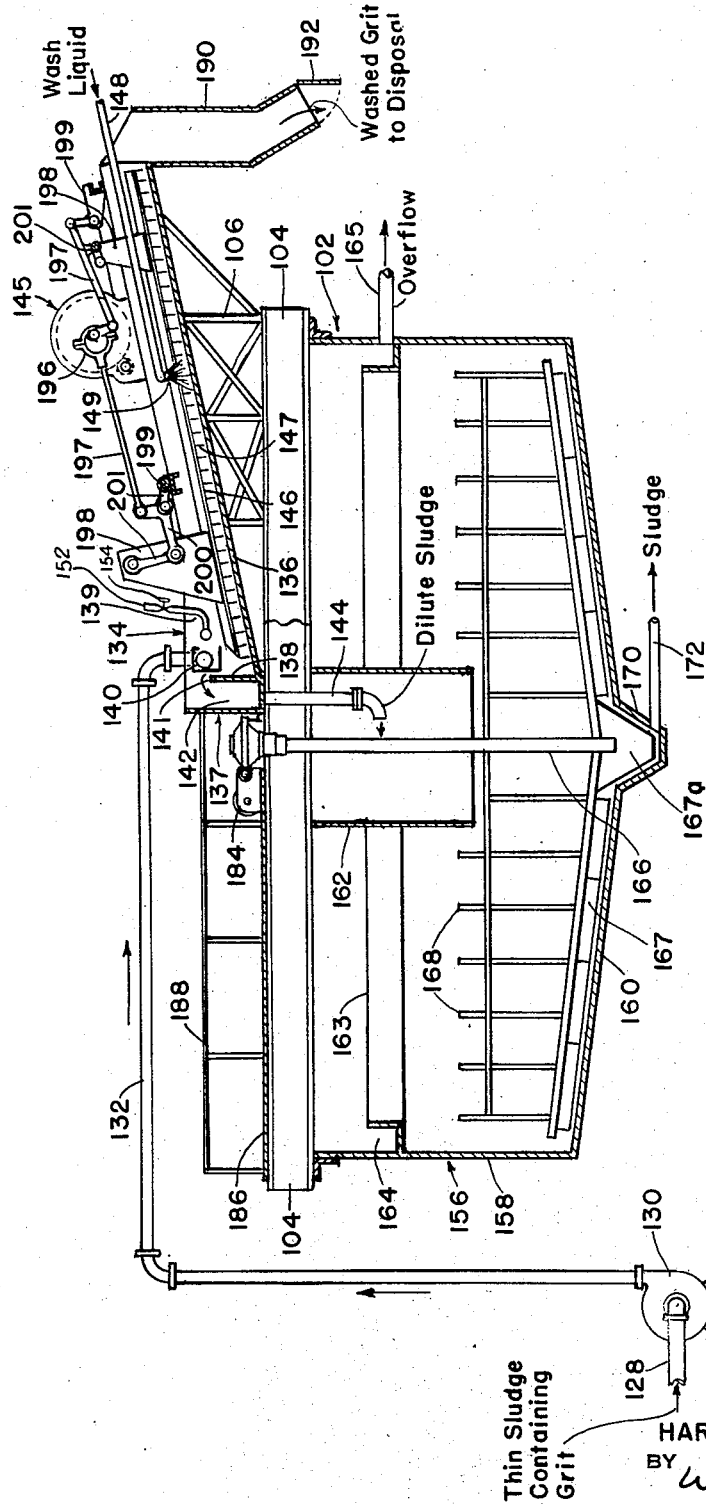
Figure 2 is a side, sectional view of an apparatus embodiment of this invention.

In Figures 2 and 3 an apparatus 102 is shown which is adapted to receive gritty sludge and simultaneously to separately discharge grit, thickened sludge and excess liquid. This apparatus comprises two sections, the grit separating section, and the sludge thickening section. The grit separating section of the apparatus comprises a rectangular tank 134 characterized by an upwardly inclined bottom or deck 136 and adapted with sidewalls 139 to contain a pool of sludge at the lower end of the deck. Gritty sludge is introduced into the pool by feed inlet means which comprise a feed launder 140 disposed across the width of the tank with the outlet thereof adapted to be submerged in the pool and to discharge over the width of the tank. Disposed transversely to the bottom of the tank is baffle 138 extending upwardly to an elevation below the top of the tank sufficient to establish a pool of sludge within the tank when sludge is introduced thereinto. In other words, the top of the baffle 138 forms an overflow edge 141. Baffle 138 is spacedly set apart from the end wall 137 of the tank to form therebetween an overflow receiving chamber 142 from which degritted sludge is withdrawn through conduit 144. Along the sloped deck are reciprocatable rake arms 146 which are actuated by rake drive assembly 145. Attached to the rake arms and disposed transversely to the sloped deck are individual scraper blades 147 which function to impel grit along the sloped deck from the lower end thereof to the opposite end. Located above the sloped deck will be found wash liquid conduit 148 with spray head 149 attached at the lower end thereof and transversely disposed in relation to the deck approximately adjacent the liquid level for washing settled grit as it emerges from the pool.

The sludge thickening section comprises a tank 156 with marginal wall 158 and bottom 160 adapted to hold a pool of sludge. The tank bottom is adapted to provide sufficient horizontal area for settling of substantially all suspended solids in the feed. The liquid level in the tank is determined by overflow edge 163 of overflow launder 164 disposed inside the tank at a height above the bottom 160 sufficient to enable sludge to be detained the amount of time necessary to reach the desired thickness. Discharge conduit 165 disposed through marginal wall 158 communicates with the overflow launder 164. The thin sludge introduction means comprises a feedwell 162 disposed in the center of the tank and extending below the elevation of overflow edge 163 to prevent short circuiting of sludge to the launder 164. The lower end of conduit 144 functions to submergedly introduce thin sludge into the feedwell 162. Tank 156 is provided with a rotatable rake structure 166 to which upright scraper blades 167 are attached, which function when the structure is travelling to non-roilingly impel thickened sludge along the tank bottom to the place of discharge. Attached to the rake structure 166 is a "picket fence" structure 168 which essentially comprises upright bars adapted to pass through thickening sludge to facilitate release of excess liquid. Centrally located within the tank is a sludge sump 170 into which thickened sludge is delivered by the blades 167 and from which sludge is discharged through conduit 172. To facilitate sludge discharge from the sump, scraper blade 167ᵃ is connected to rake structure 166 to rotate within said sump. Across the top of tank 156 and resting on wall 158 is girder structure 104 on which tank 134 rests and to which truss 106, which supports rake drive assembly 145, is attached. Structure 104 also supports drive means 184, for rotating rake structure 166. To obtain easy access to drive means 184 and to the grit separating section, supporting structure 104 is provided with a walkway 186 with rails 188.

The rake drive assembly 145 for the grit separation section comprises a motor 194 which, through intermediate gears actuates eccentric 196. Reach rods 197 attached to eccentric 196 are connected to hangers 198 by means of bell cranks 200 and links 201 to which counter weights 199 are attached. The rotational movement of eccentric 196 imparts through the reach rods, links and bell crank both the reciprocating and up and down movement to rake structure 146.

Washed-grit hopper 190 is provided at the discharge end of the inclined deck 136 to receive washed grit and to store it until enough has accumulated for economical disposal. Accordingly, hinged gate 192 is provided which may be opened to remove the accumulated grit.

In the operation of apparatus 102 thin gritty sludge is introduced into the sludge pool in tank 134 by way of conduit 132. While in some cases the flow through 132 may be the result of gravity, I have shown a sludge pump 130 which functions also to suck sludge from the pretreatment station through conduit 128. By adjustment of the pump speed, and thus the suction in conduit 128, the solids concentration of the gritty sludge may be controlled to be sufficiently low. Upon entry into the sludge pool grit settles to the sloped bottom 136 of the tank and is impelled along it by the blades 147. Diluent may, if necessary or desirable, be added by means of conduit 152 with associated control valve 154. The bulk of organic solids comprising the sludge remain in suspension in the pool except for the relatively small quantity which settles out with the grit. However, as the settled grit is impelled up the sloped deck 136 the turbulence of the rakes plus runback of liquid as the grit emerges from the pool function to resuspend settled organic solids. As the grit emerges from the liquid level of the pool it preferably meets a spray of wash liquid ejected from spray head 149 whereby tenaciously clinging organic matter and residual settled organic solids are rinsed from the grit particles back into the sludge pool. The rake blades 147 function to impel the grit after emergence further up the sloped deck thereby enabling the residual liquid to drain off so that when the grit reaches the end of the sloped deck 136 it drops into grit hopper 190 in a substantially drained condition free of putrescible matter. Because of the continuous introduction of gritty sludge into the pool in tank 134 degritted sludge continuously overflows edge 141 of baffle 138 into the overflow receiving chamber 142 and from there flows through conduit 144 into feedwell 162 of tank 156. Under the quiescent conditions established and maintained within that tank the sludge migrates towards the bottom 160 and commences to compact itself to release excess liquid which migrates to overflow into launder 164, while the thickened sludge collects on the bottom 160. It is preferred that sufficient compaction occur to produce a thickened sludge product of 6 to 7 percent solids. In some instances this may not be possible where raw sewage introduced into the sewage treatment system is not fresh and has started to turn septic by the time the degritted sludge is introduced into tank 156. Under such conditions, the sludge should be removed from 156 after a detention time short of that at which "gasing" occurs. However, if a diluent having a minimal biochemical oxygen demand, and, if feasible, having a dissolved air or oxygen content is used, a sludge solids concentration of at least 6% or 7% should be obtainable within the thickening section of this apparatus. In any event, the thickened sludge collecting on the bottom 160 is non-roilingly impelled by scraper blades 167 into sump 170 from whence it is removed through discharge conduit 172 with the aid of scraper blade 167ᵃ.

One of the major advantages, namely savings in cost, accruing from the removal of grit from sludge as compared to the removal of grit from raw sewage may be strikingly brought out by examining the physical plant required to practice according to this invention, as compared to that required in order to practice according to the prior teachings of the art at an installation where sludge thickening means are to be provided regardless of which degritting practice is followed. Assuming (1) an average raw sewage flow rate of 10 million gallons per day, (2) a maximum flow rate of 25 million gallons per day, (3) a grit removal amounting to 1.0 cubic yard per million gallons per day at maximum flow (95% removal of the +65 mesh grit), (4) 300 parts per million of suspended solids present in the raw sewage at average flow, and (5) a 50% removal of suspended solids by primary clarification, it may be computed that, under the worst conditions, grit removal will come to 75,000 pounds per day, while suspended solids removal (computed on the basis of average conditions since, in a given installation, the suspended solids concentration of the sewage is almost invariably in inverse proportion to the rate of flow) will amount to 12,500 pounds per day. Total solids to be handled will therefore be 87,500 pounds per day, which, at 2% solids and a specific weight of 63 pounds per cubic foot of wet solids, amounts to approximately 69,500 cubic feet per day or approximately 362 gallons per minute. The major items of apparatus required to practice the teachings of this invention under the operating conditions set forth above, and omitting elements such as thickening tanks which are to be used regardless of how grit is removed, would comprise two mechanical sludge-grit separators, 3 feet wide by 15 feet long and two 4 inch, 180 gallon per minute capacity pumps. A typical installation following conventional practices would require two sewage-grit separators each adapted to fit into basins 18 feet square by 3 feet 6 inches deep, two concrete basins of the said dimension, and one sludge pump. Present cost figures indicate that the cost of the conventional system, installed and in operable condition, would be considerably more than double that of the new system herein set forth. The space savings which may be of material importance in certain situations, is also evident from the above example.

Furthermore, greater flexibility is provided. Where it is desired to change the mesh of separation of grit to remove finer sizes of grit, the flow rate of sludge to the grit separator can be adjusted to give these results by controllably recirculating a portion of the sludge flow. In the conventional system the flow rate can be decreased only through by-passing a portion of the raw sewage around the grit separating apparatus which usually means that grit is not separated from that by-passed portion. In the system according to this invention substantially all grit desired to be separated is removed before the sludge is sent through channels leading to disposal.

I claim:

1. In the continuous process for treating polluted liquids by the removal of settleable organic solids and grit, the improvement which comprises treating said liquid in a settling tank to produce a clarified overflow product by simultaneously removing therefrom, as a second product, the bulk of said organic solids and the bulk of said grit in the form of a heterogeneous sludge of organic solids with grit dispersed therein, withdrawing said heterogeneous sludge from said tank, introducing said heterogeneous sludge into a grit separation station wherein a solids concentration of less than four percent is established and maintained whereat grit is free to separate, separating grit from said sludge and removing degritted sludge from said station.

2. In the continuous process according to claim 1, establishing and maintaining said sludge solids concentration by withdrawing the sludge from the pretreatment station substantially as soon as it has formed.

3. In the continuous process according to claim 1, establishing and maintaining said sludge solids concentration by the controlled addition of diluent to the sludge.

4. In the continuous process according to claim 1, the additional step of extracting from said degritted sludge a portion of the liquid contained therein, thereby rendering the sludge more amenable to further treatment.

5. In the continuous process according to claim 1, controlling the separation of grit within the grit separation station by control of the sludge flow rate to said station, and recirculating excess sludge withdrawn from the pretreatment station to the pretreatment station for re-separation.

6. In the continuous process according to claim 1, removing separated grit from the grit separation station.

7. In the continuous process according to claim 1, removing separated grit from the grit separation station, and prior to its disposal washing the grit substantially free from organic matter.

8. A combined grit separator and sludge thickener apparatus adapted to receive thin, heterogeneous sludge of organic solids with grit dispersed therein, and to discharge, as products, thick, degritted sludge, excess liquid, and grit, which comprises a grit separation section and a sludge thickening section, said grit separation section comprising means for containing a pool of thin, grit bearing sludge, means for introducing said sludge into said pool, means for removing settled grit from said pool, means for removing degritted sludge from said pool and introducing it into the sludge thickening section, said sludge thickening section comprising means for receiving said degritted sludge and holding it in a pool while the sludge thickens to release excess liquid, means for removing thickened sludge, and means for removing excess liquid.

9. The apparatus according to claim 8 with the addition of means for washing grit after it has separated from the sludge but before it has been discharged from the apparatus.

10. The apparatus according to claim 8 with the addition of means for controllably adding a diluent to the sludge pool in the grit separation section.

References Cited in the file of this patent

UNITED STATES PATENTS

| | | |
|---|---|---|
| 1,979,955 | Besselievre | Nov. 6, 1934 |
| 2,202,475 | Wileman | May 28, 1940 |
| 2,221,444 | Dodge et al. | Nov. 12, 1940 |
| 2,378,756 | Durdin | June 19, 1945 |
| 2,425,932 | Green et al. | Aug. 19, 1947 |
| 2,442,241 | Koruzo et al. | May 25, 1948 |
| 2,517,792 | Kraus | Aug. 8, 1950 |